(12) United States Patent
Ueshima et al.

(10) Patent No.: US 10,890,977 B2
(45) Date of Patent: Jan. 12, 2021

(54) HAPTIC FEEDBACK DEVICE AND PROGRAM FOR VIRTUAL OBJECTS

(71) Applicant: Kurimoto, Ltd., Osaka (JP)

(72) Inventors: Yuya Ueshima, Osaka (JP); Keisuke Kinoi, Osaka (JP); Shuichi Akaiwa, Osaka (JP); Hitoshi Tsuji, Osaka (JP); Katsutoshi Hata, Tokyo (JP)

(73) Assignee: Kurimoto, Ltd., Osaka (JP)

( * ) Notice: Subject to any disclaimer, the term of this patent is extended or adjusted under 35 U.S.C. 154(b) by 0 days.

(21) Appl. No.: 16/517,101

(22) Filed: Jul. 19, 2019

(65) Prior Publication Data

US 2020/0033948 A1 Jan. 30, 2020

(30) Foreign Application Priority Data

Jul. 27, 2018 (JP) .................................. 2018-140869

(51) Int. Cl.
*G06F 3/00* (2006.01)
*G06F 3/01* (2006.01)
*G06F 3/0484* (2013.01)
*G06F 3/0338* (2013.01)

(52) U.S. Cl.
CPC .............. *G06F 3/016* (2013.01); *G06F 3/013* (2013.01); *G06F 3/017* (2013.01); *G06F 3/0338* (2013.01); *G06F 3/04842* (2013.01)

(58) Field of Classification Search
CPC combination set(s) only.
See application file for complete search history.

(56) References Cited

U.S. PATENT DOCUMENTS

| | | | |
|---|---|---|---|
| 2010/0107502 A1* | 5/2010 | Okada | F16D 37/02 49/349 |
| 2014/0372957 A1* | 12/2014 | Keane | G06F 3/011 715/852 |
| 2018/0001191 A1* | 1/2018 | Black | A63F 13/28 |
| 2018/0284896 A1* | 10/2018 | Kearney | G06F 3/04815 |
| 2019/0224854 A1* | 7/2019 | Hanetseder | G06F 3/0362 |

FOREIGN PATENT DOCUMENTS

JP 2016-530600 A 9/2016

* cited by examiner

*Primary Examiner* — Michael J Jansen, II
*Assistant Examiner* — Sosina Abebe
(74) *Attorney, Agent, or Firm* — Nakanishi IP Associates, LLC

(57) ABSTRACT

A haptic feedback device for virtual objects includes a head-mounted display unit, an HMD control unit, a haptic feedback unit, and a haptic information DB for storing haptic information in association with each type of virtual object. The HMD control unit includes a display controller that causes a virtual object and a user focus to appear on a display, and a haptic information transmitter that reads, when the user focus is placed over a selectable virtual object, haptic information associated with the type of the selected virtual object from the haptic information DB, and transmits the haptic information to the haptic feedback unit. The haptic feedback unit includes a movable portion movable with a user operation, a movement resistance generator that applies movement resistance to the movable portion, and a power feed controller (movement resistance controller).

8 Claims, 19 Drawing Sheets

HAPTIC FEEDBACK DEVICE AND PROGRAM FOR VIRTUAL OBJECTS

FIELD OF INVENTION

The present invention relates to a haptic feedback device and a haptic feedback program for virtual objects that provide haptic feedback of virtual objects appearing on a display.

BACKGROUND OF ART

Head-mounted displays for displaying virtual objects are commercially available, including HoloLens (registered trademark) manufactured by Microsoft Corporation in the U.S. This head-mounted display includes a see-through display on which objects appear to be merged in the real world. A user focus for allowing the user to select a virtual object can also appear on this display. The user focus can appear at an intersection between the user's gaze called Gaze and a virtual object or the real world. When the user places the user focus over a selectable virtual object and then performs a predetermined hand gesture (e.g., a hand gesture called air tap), the virtual object is selected to start a predetermined process associated with the virtual object, for example, changing the shape of the virtual object, producing a sound effect, or executing a predetermined application program. The user performs a predetermined hand gesture within an area perceivable by a hand gesture sensor (e.g., an infrared camera or a depth camera) included in HoloLens (registered trademark).

A similar technique is described in, for example, Patent Literature 1. A device described in Patent Literature 1 displays a virtual object in the real world on a see-through head-mounted display and allows a user to select the virtual object by using the user focus. The shape of the selected virtual object can be changed.

CITATION LIST

Patent Literature

Patent Literature 1: Japanese Unexamined Patent Application Publication (Translation of PCT Application) No. 2016-530600

SUMMARY OF INVENTION

Problem to be Solved

The inventors of the present application have noticed that providing a user's hand with haptic feedback corresponding to a virtual object selected by the user performing a hand gesture will expand the use of a head-mounted display and improve its convenience, amusement, and other features.

Means for Solving Problem

One or more aspects of the present invention are directed to a haptic feedback device for virtual objects that can provide a user's hand with haptic feedback corresponding to the type of a virtual object appearing on a display.

A haptic feedback device for virtual objects according to one aspect of the present invention includes a display unit, a display control unit that controls a display included in the display unit, a haptic feedback unit that provides haptic feedback to a user, and a haptic information storage that stores haptic information in association with a type of a selectable virtual object. The display control unit includes a display controller that causes a selectable virtual object and a virtual object selector for allowing the selectable virtual object to be selected with an operation performed by the user to appear on the display, and a haptic information transmitter that reads, when the selectable virtual object is selected by the virtual object selector, haptic information associated with a type of the virtual object selected from the haptic information storage, and transmits the haptic information to the haptic feedback unit. The haptic feedback unit includes a movable portion movable with an operation performed by the user, a movement resistance generator that applies movement resistance to the movable portion, and a movement resistance controller that controls the movement resistance applied by the movement resistance generator to the movable portion in accordance with the haptic information received from the haptic information transmitter.

The haptic feedback device for virtual objects with the above structure provides a user's hand with haptic feedback corresponding to the type of a virtual object appearing on the display.

In the haptic feedback device for virtual objects with the above structure, the display unit may be a head-mounted display unit, the virtual object selector may be a user focus shiftable with an operation performed by the user, and the haptic information transmitter may read, when the user focus overlaps the selectable virtual object, haptic information associated with the type of the virtual object selected from the haptic information storage, and may transmit the haptic information to the haptic feedback unit.

In the haptic feedback device for virtual objects with the above structure, the movement resistance generator and the movable portion included in the haptic feedback unit may be part of a grip member to be held and movable by a hand of the user, the grip member may include a grip member position information detector that detects information about a position of the grip member, and the display control unit may include a focus position determiner that determines a position of the user focus appearing on the display based on the information about the position detected by the grip member position information detector.

The haptic feedback device for virtual objects with the above structure may further include a hand state detection unit that detects information about a user's hand state, in which the display control unit may include a hand gesture recognizer that determines whether the user has performed a predetermined hand gesture based on the information detected by the hand state detection unit, and the display control unit may perform a predetermined process when the hand gesture recognizer determines that the user has performed the predetermined hand gesture in a state where the selectable virtual object is being selected by the virtual object selector.

In the haptic feedback device for virtual objects with the above structure, the haptic feedback unit may further include a movement amount detector that detects information about a movement amount of the movable portion, and the display control unit may perform a predetermined process when the movement amount detected by the movement amount detector is larger than or equal to a predetermined value in a state where the selectable virtual object is being selected by the virtual object selector.

In the haptic feedback device for virtual objects with the above structure, the predetermined process may be a predetermined display operation on the display performed by the display controller included in the display control unit.

In the haptic feedback device for virtual objects with the above structure, the haptic feedback unit may further include a movement amount detector that detects information about a movement amount of the movable portion, the haptic information storage may store haptic information in association with the type of the selectable virtual object and the movement amount of the movable portion, and the haptic information transmitter in the display control unit may read, in a state where the selectable virtual object is being selected by the virtual object selector, haptic information associated with the type of the virtual object selected and the movement amount of the movable portion from the haptic information storage, and may transmit the haptic information to the haptic feedback unit.

In the haptic feedback device for virtual objects with the above structure, the movement resistance generator in the haptic feedback unit may include a rotary portion that rotates in combination with the movable portion, and a rotational resistance generator that applies rotational resistance to the rotary portion, and the rotational resistance generator may include an internal rotor that rotates together with the rotary portion, a magnetic viscous fluid filling a clearance around the internal rotor, and an electromagnet that applies a magnetic field onto the magnetic viscous fluid.

A program according to another aspect of the present invention is a program causing a computer to function as a display control unit included in a haptic feedback device for virtual objects. The haptic feedback device for virtual objects includes a display unit, a display control unit that controls a display included in the display unit, a haptic feedback unit that provides haptic feedback to a user, and a haptic information storage that stores haptic information in association with a type of a selectable virtual object. The haptic feedback unit includes a movable portion movable with an operation performed by the user, a movement resistance generator that applies movement resistance to the movable portion, and a movement resistance controller that controls the movement resistance applied by the movement resistance generator to the movable portion in accordance with haptic information received from a haptic information transmitter. The program causes the display control unit to function as a display controller that causes a selectable virtual object and a virtual object selector for allowing the selectable virtual object to be selected with an operation performed by the user to appear on the display, and the haptic information transmitter that reads, when the selectable virtual object is selected by the virtual object selector, haptic information associated with a type of the virtual object selected from the haptic information storage, and transmits the haptic information to the haptic feedback unit.

Effects of the Invention

The technique according to the above aspects of the present invention provides a user's hand with haptic feedback corresponding to a virtual object.

DETAILED DESCRIPTION

First Embodiment

Figure 1:
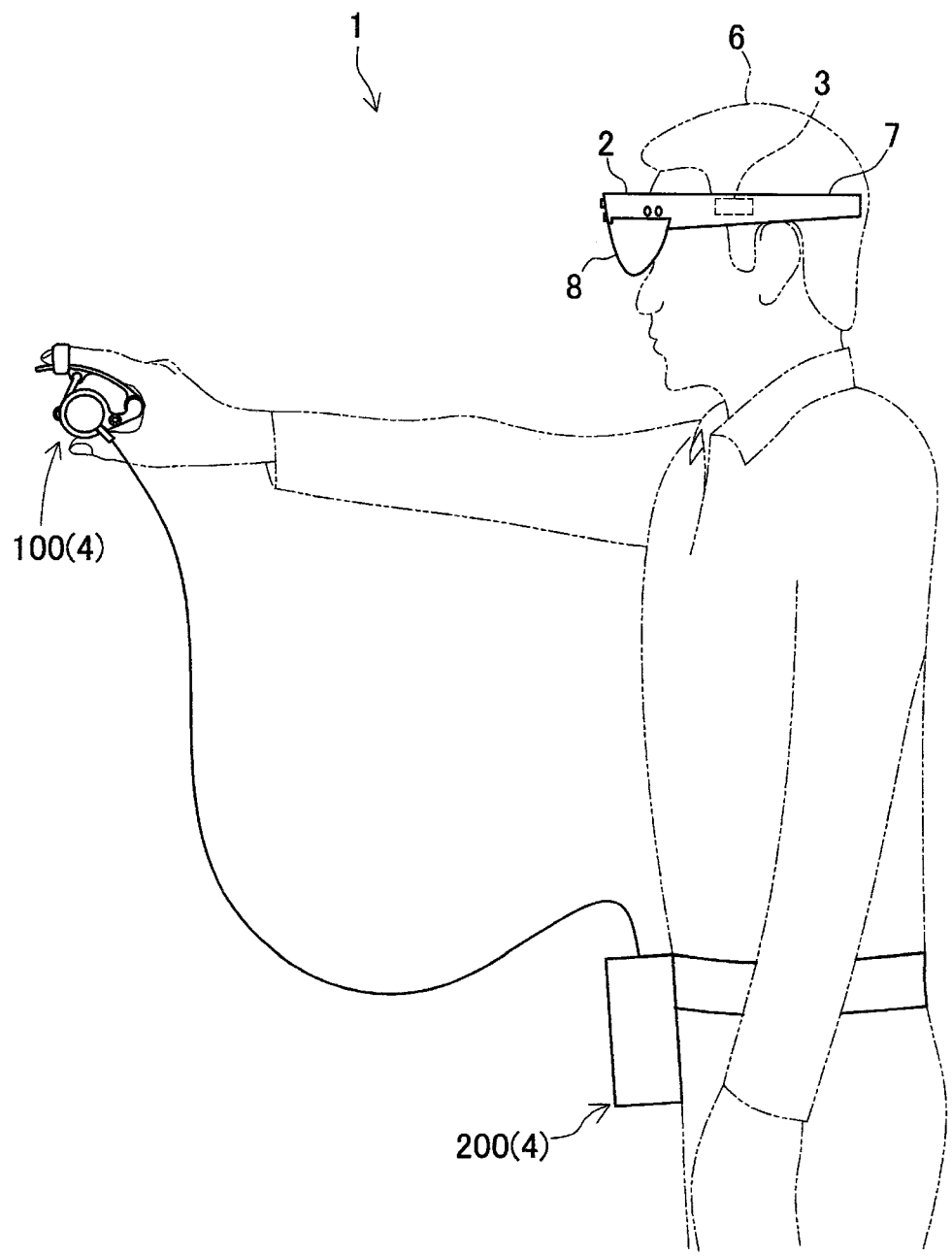
FIG. 1 is an overall view of a haptic feedback device for virtual objects.
Figure 2:
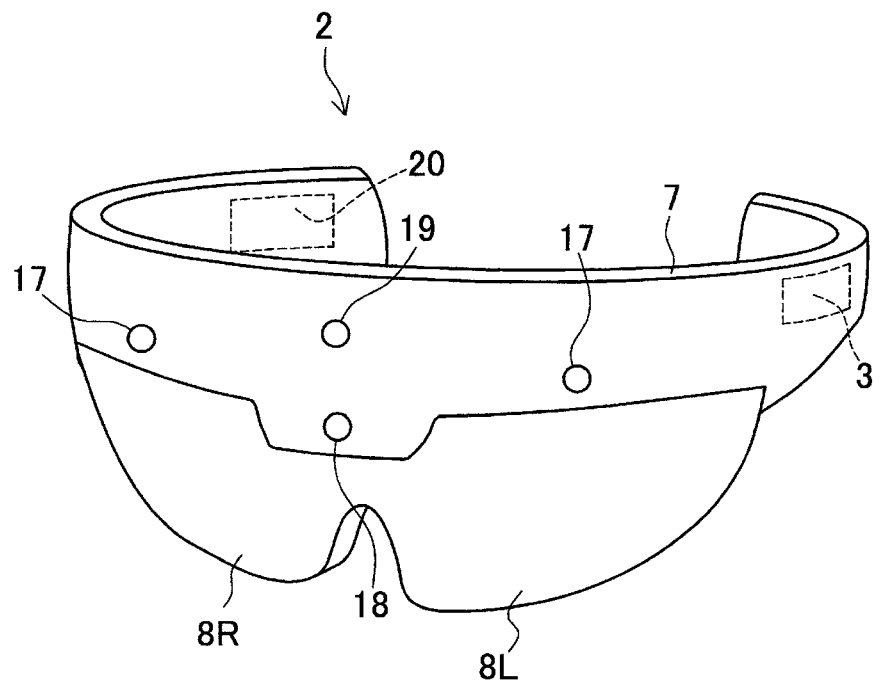
FIG. 2 is a schematic diagram of a head-mounted display unit.

A first embodiment of the present invention will now be described with reference to the drawings. As shown in FIGS. 1 and 2, a haptic feedback device 1 for virtual objects according to the present embodiment includes a head-mounted display unit 2, a head-mounted display (HMD) control unit 3, and a haptic feedback unit 4.

The head-mounted display unit 2 includes a frame 7 worn on the head of a user 6, and a left-eye display 8L and a right-eye display 8R (hereafter collectively referred to as a display 8) attached to the frame 7. In the present embodiment, the displays 8L and 8R are see-through displays that display a composite image of the real world and virtual objects in the field of view of the user 6. The see-through displays may have the same structure as any of many known structures described in Literature (e.g., the see-through display described in Patent Literature 1).

The HMD control unit 3 controls the displays 8L and 8R included in the head-mounted display unit 2. In the present embodiment, the HMD control unit 3 is attached to the frame 7 of the head-mounted display unit 2. The HMD control unit 3 may include, for example, an operation system (OS) and an application program installed in an ultra-small personal computer. For example, each of the head-mounted display unit 2 and the HMD control unit 3 according to the present embodiment may be HoloLens (registered trademark) manufactured by Microsoft Corporation in the U.S.

Figure 3:
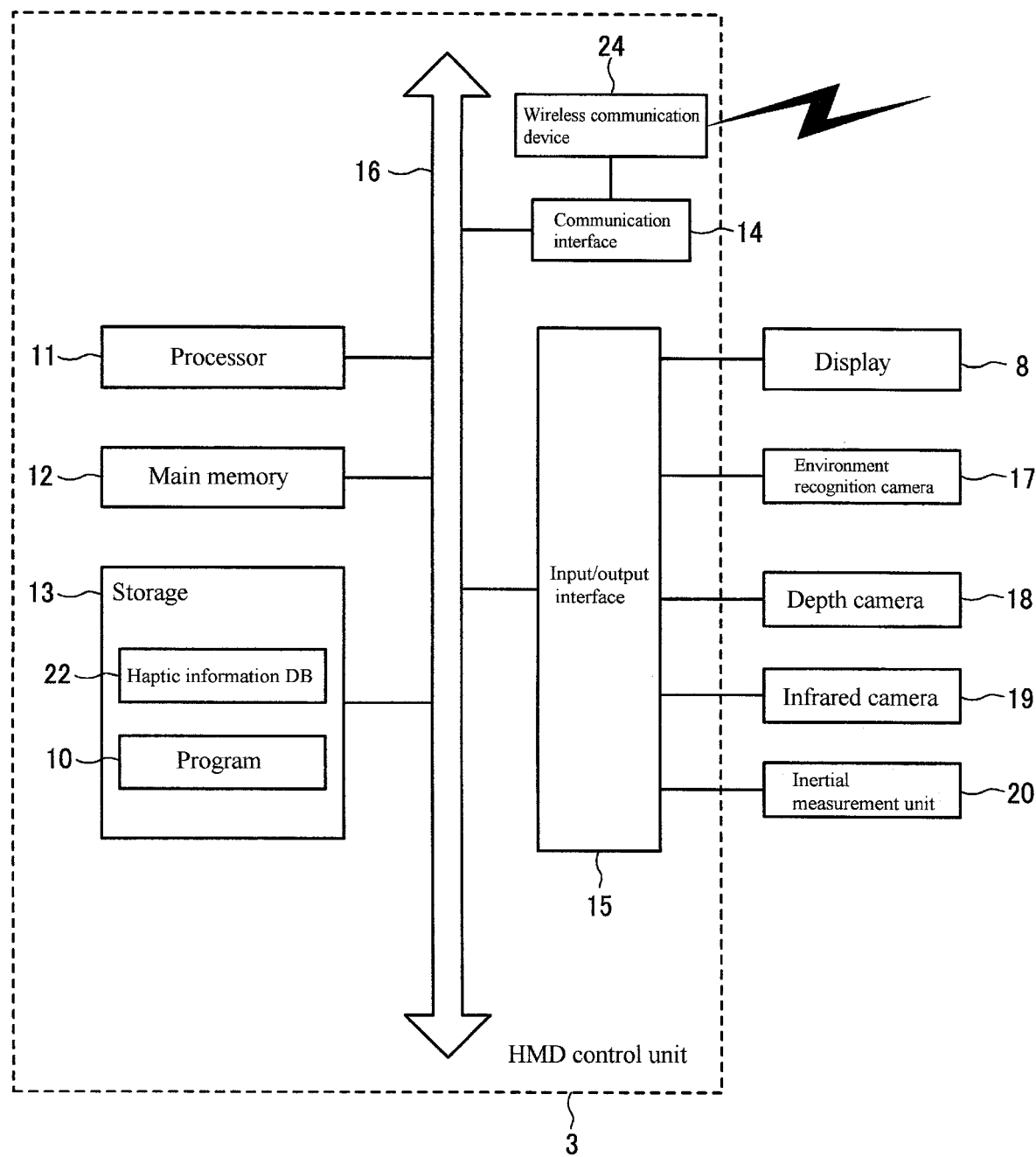
FIG. 3 is a block diagram of a head-mounted display (HMD) control unit showing its hardware configuration.

FIG. 3 is a block diagram of the HMD control unit 3 showing its example schematic configuration. Although the HMD control unit 3 has the hardware configuration illustrated in FIG. 3, the HMD control unit 3 may have another hardware configuration that implements its functions.

The HMD control unit 3 shown in FIG. 3 includes a processor 11, a main memory 12, a storage 13, a communication interface 14, and input/output interfaces 15 for a variety of devices. These components 11 to 15 are connected to one another with a bus 16. Although the input/output interfaces 15 are provided in one-to-one to the devices 8 and 17 to 20 described later, the input/output interfaces 15 are collectively illustrated as a single block in FIG. 3.

The processor 11 implements a variety of functions described later by executing a program 10 (including an operation system or OS, and an application program) stored in the storage 13.

Figure 4:
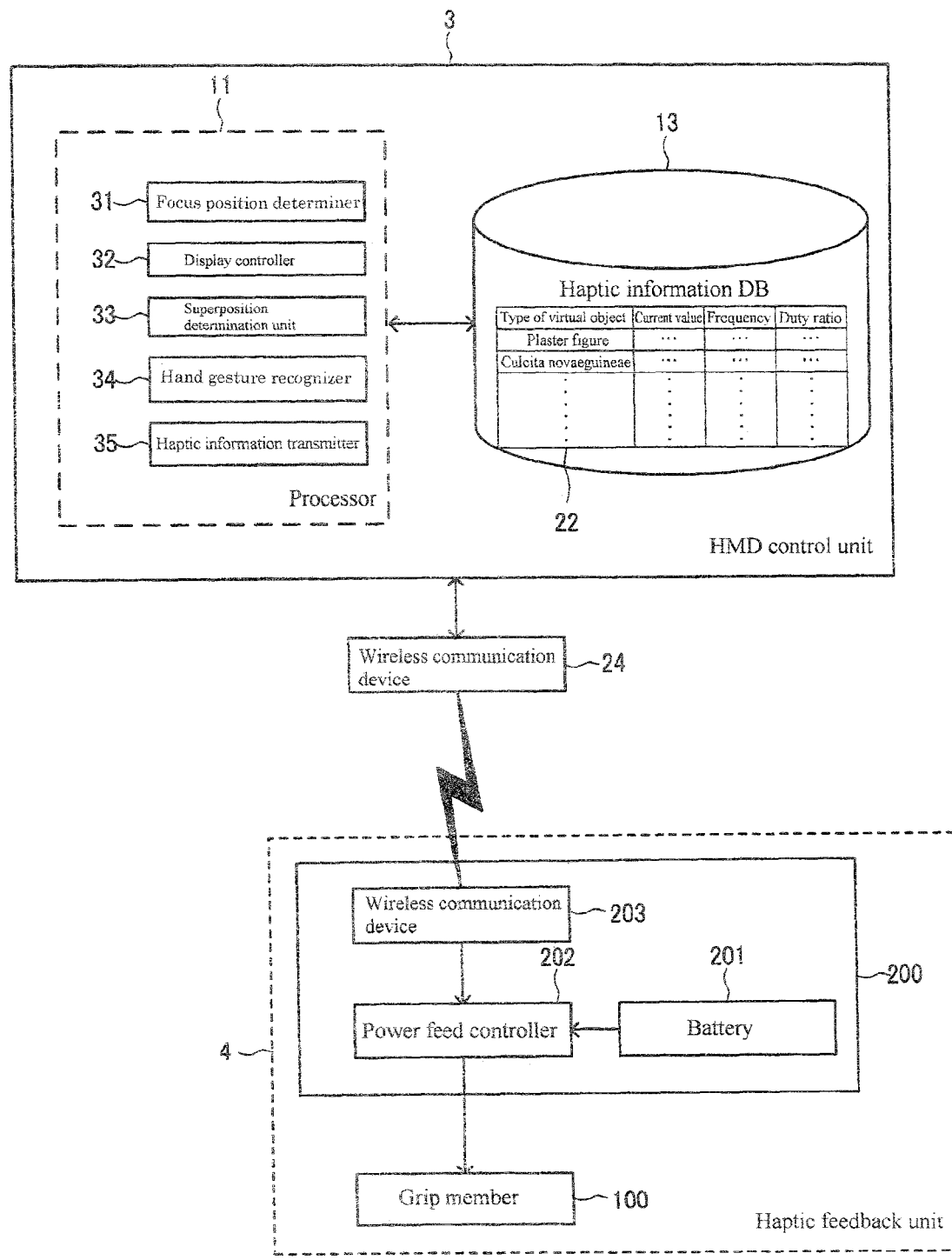
FIG. 4 is a functional block diagram of the HMD control unit and a haptic feedback unit according to a first embodiment.

The storage 13 stores a haptic information database (DB) 22, in addition to the program 10. As shown in FIG. 4, the haptic information DB 22 includes haptic information for various types of virtual objects. More specifically, the haptic information DB 22 includes parameter information about a current fed to a rotational resistance generator 104 included in the haptic feedback unit 4 (described later) for each type of virtual object. The parameter information includes the current value, the frequency, and the duty ratio for each type of virtual object. The current value, the frequency, and the duty ratio are mere example items of parameter information, and other items of parameter information may be used in place of or in addition to these example items.

A wireless communication device 24 is connected to the communication interface 14. The HMD control unit 3 performs wireless communications with a wireless communication device 203 included in the haptic feedback unit 4 (described later) through the wireless communication device 24. In the present embodiment, the wireless communication devices 24 and 203 perform wireless communications with each other through Bluetooth (registered trademark). Instead of wireless communications, wired communications may be used. Wireless communications may be performed using a communication protocol other than Bluetooth (registered trademark).

As shown in FIG. 3, the HMD control unit 3 is connected to the display 8, environment recognition cameras 17, a depth camera 18, an infrared camera 19, and an inertial measurement unit 20.

The display 8 displays virtual objects in the real world based on image information received from the HMD control unit 3.

The environment recognition cameras 17 obtain image information about the real-world environment. The depth camera 18 obtains depth-of-field information. The HMD control unit 3 produces precise three-dimensional space information about the real world based on information obtained from the environment recognition cameras 17 and the depth camera 18, and reflects the obtained information in the image information for the displays 8L and 8R.

The infrared camera 19 obtains information about infrared rays radiated from the surface of an object. The HMD control unit 3 obtains information about the user's hand state from the infrared camera 19 and the depth camera 18. In the present embodiment, the infrared camera 19 and the depth camera 18 together correspond to a hand state detection unit that detects information about the user's hand state.

The inertial measurement unit 20 includes inertial sensors such as a three-axis magnetic sensor, a three-axis gyro sensor, and a three-axis accelerometer. The inertial measurement unit 20 senses the position, orientation, and acceleration of the head-mounted display unit 2. The HMD control unit 3 specifies the user gaze direction based on information obtained from the inertial measurement unit 20, and causes a user focus 28 to appear at an intersection between the user's gaze and the real world or a virtual object on the display 8 (refer to FIG. 5). The user focus 28 according to the present embodiment appears differently when placed over a selectable object and when not placed over a selectable object. The user focus 28 placed over a selectable object appears in the shape of a doughnut. The user focus 28 not placed over a selectable object appears in the shape of a semitransparent circle. In the example image appearing on the display 8 shown in FIG. 5, only a plaster figure appears as a selectable virtual object 38, and other objects such as a table 39, a window 40, walls 41, and a floor 42 appear as real world objects.

The functions implemented by the HMD control unit 3 with the processor 11 executing a program will now be described. When the processor 11 executes a program, the HMD control unit 3 functions as a focus position determiner 31, a display controller 32, a superposition determination unit 33, a hand gesture recognizer 34, and a haptic information transmitter 35 as shown in FIG. 4.

The focus position determiner 31 calculates a user gaze direction (specifically, a direction in which the user faces) based on information obtained from the inertial measurement unit 20, and determines, as the position of the user focus 28, the intersection between the real world or a virtual object and the user's gaze in the field of view of the display 8. The user focus 28 shifts as the user gaze direction changes.

Figure 5:
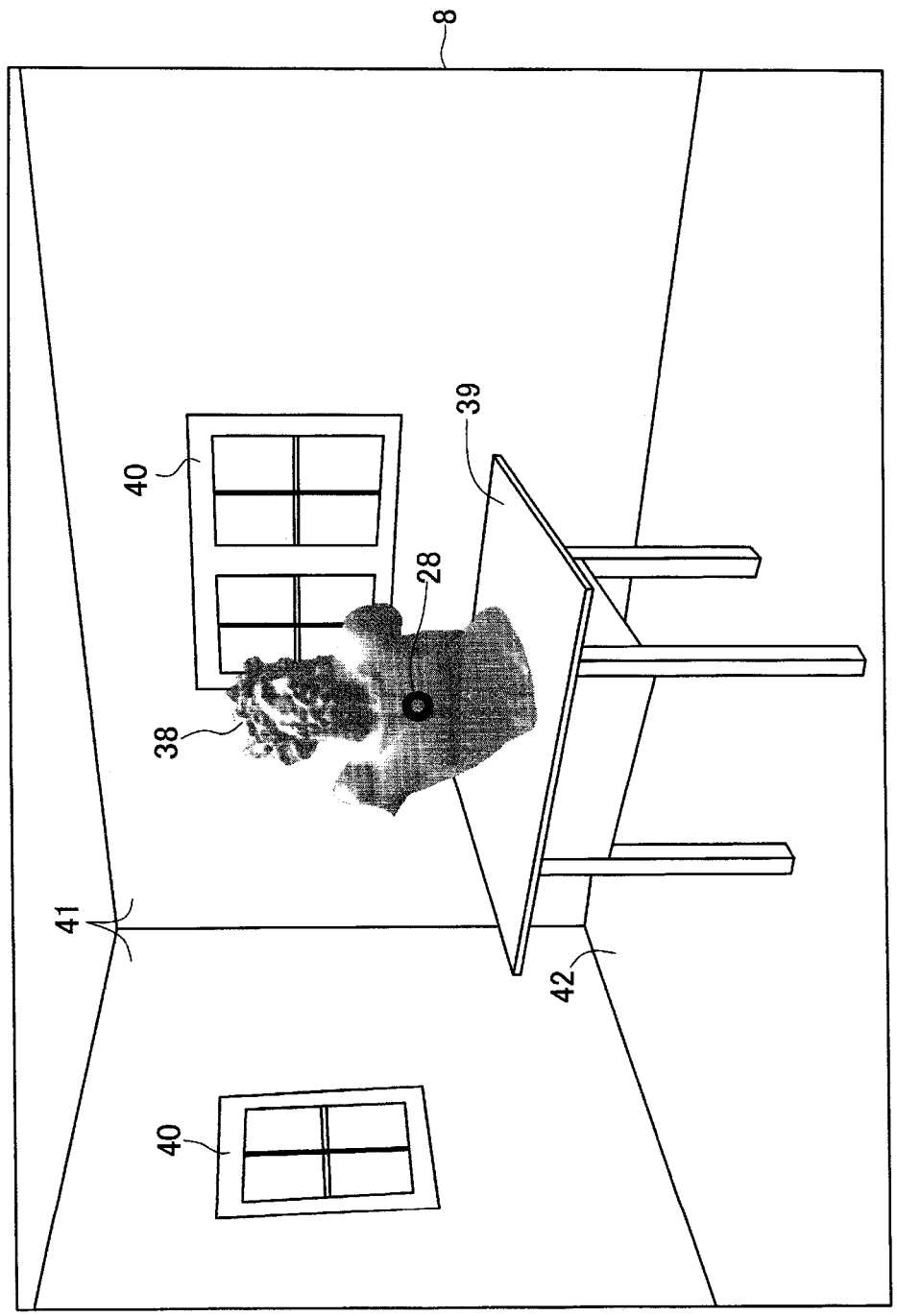
FIG. 5 is a diagram showing an example image of the real world and a virtual object appearing on a display.

As shown in FIG. 5, the display controller 32 causes the virtual object 38 to appear on the display 8, and the user focus 28 to appear at the position determined by the focus position determiner 31. When the user performs a predetermined hand gesture while the user focus 28 is placed over (overlaps) the virtual object 38, the display controller 32 performs a predetermined display operation on the display 8. Examples of the predetermined display operation include deforming the virtual object, causing the virtual object to disappear, and displaying another virtual object.

The superposition determination unit 33 determines whether the user focus 28 is placed over the selectable virtual object 38.

The hand gesture recognizer 34 determines whether the user has performed a predetermined hand gesture based on information about the user's hand state detected by the infrared camera 19 and the depth camera 18 (detected by a hand state detection unit).

When the user focus 28 is placed over the selectable virtual object 38, the haptic information transmitter 35 reads haptic information associated with the virtual object 38 from the haptic information DB 22, and transmits the information to the haptic feedback unit 4. When the hand gesture recognizer 34 determines that the user has performed a predetermined hand gesture, the haptic information transmitter 35 transmits, to the haptic feedback unit 4, a command to stop providing haptic feedback. In the present embodiment, the predetermined hand gesture is the action of pressing down a forefinger from a raised position (air tap).

Details of Haptic Feedback Unit

The haptic feedback unit 4 will now be described. As shown in FIG. 1, the haptic feedback unit 4 according to the present embodiment includes a grip member 100 and a power feed unit 200. The grip member 100 is held in a hand by the user, and is operable while being moved freely by the user.

Figure 6:
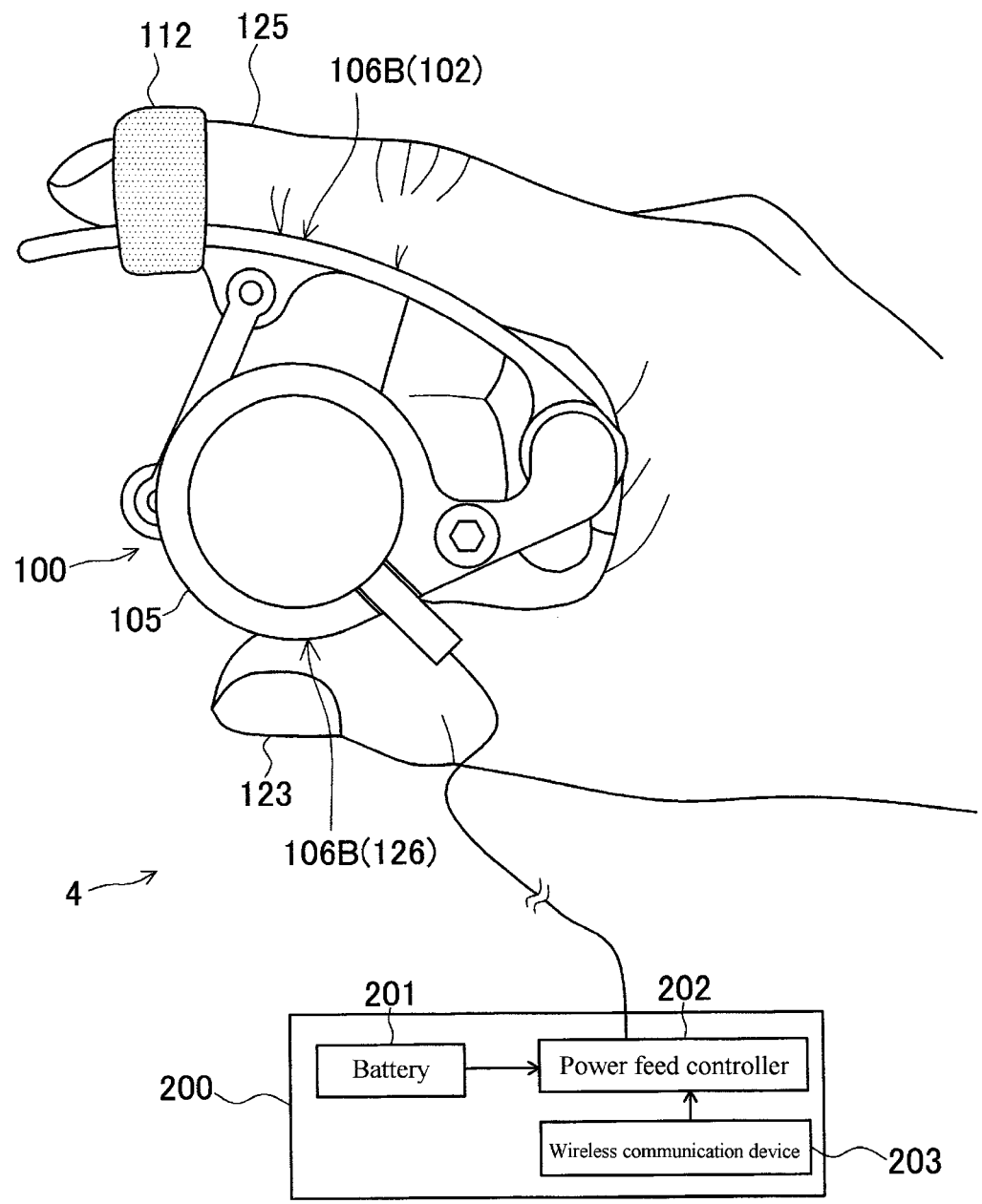
FIG. 6 is a left side view of a grip member in the haptic feedback unit operated by an operator, also showing a power feeding unit in a block diagram.
Figure 7:
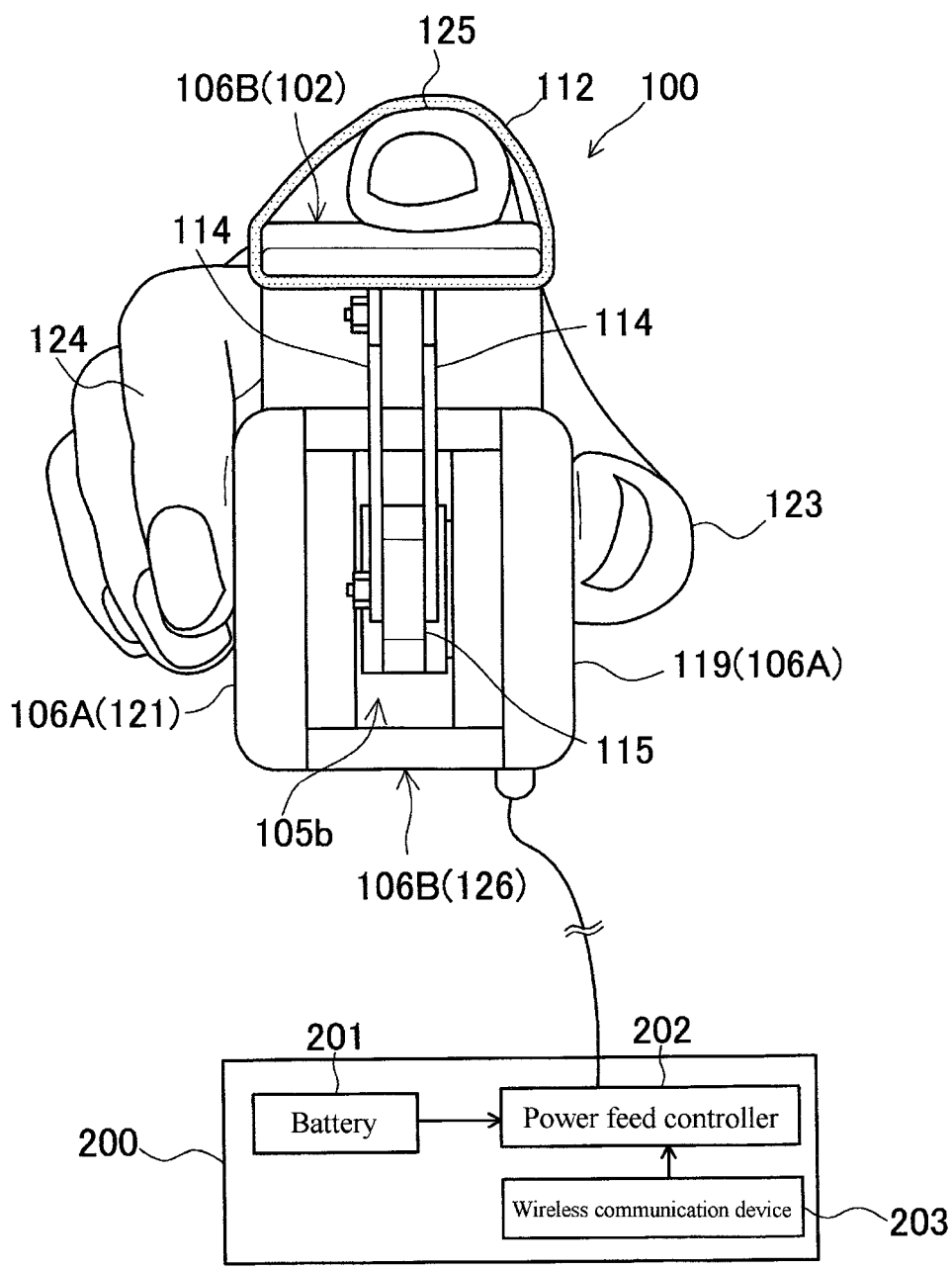
FIG. 7 is a front view of the grip member in the haptic feedback unit operated by an operator, also showing the power feeding unit in a block diagram.

As shown in FIG. 6 or 7, the grip member 100 is shaped and sized to be held in the user's hand. The user holding the grip member 100 in his or her hand can operate the grip member 100. The grip member 100 provides the user with haptic feedback corresponding to a current fed from the power feed unit 200 through a movable portion 102.

As shown in FIGS. 8 to 13, the grip member 100 includes the movable portion 102, a rotational shaft 103, a rotational resistance generator (movement resistance generator) 104, and a casing 105. The grip member 100 includes two holding portions 106A and 106B.

Figure 9:
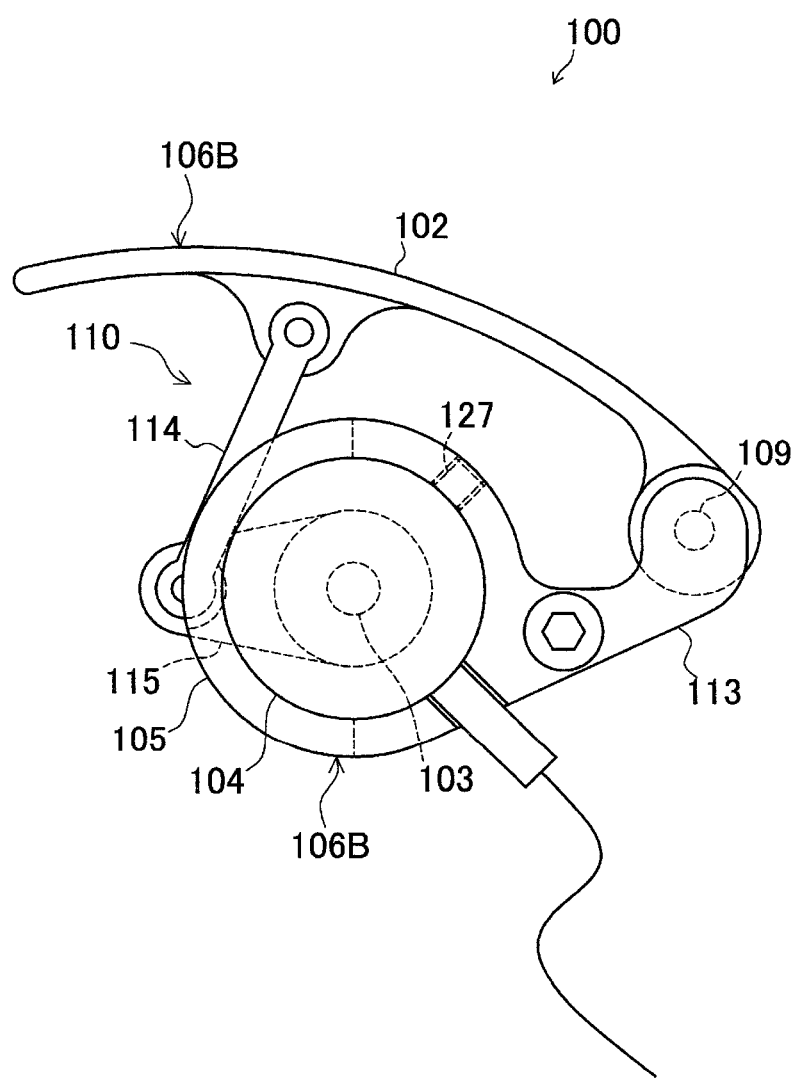
FIG. 9 is a left side view of the grip member in the haptic feedback unit.

The movable portion 102 is moved relative to the casing 105 in accordance with a user operation. In the present embodiment, the movable portion 102 pivots about a pivot axis 108 at its one end to move toward or away from the casing 105. The movable portion 102 is pivotably supported by a pivot shaft 109 at its one end. As shown in FIG. 9, the movable portion 102 includes a plate curved in an arc. An operation force of the user for pivoting the movable portion 102 is transmitted to the rotational shaft 103 as a rotary portion through a link mechanism 110.

Figure 13:
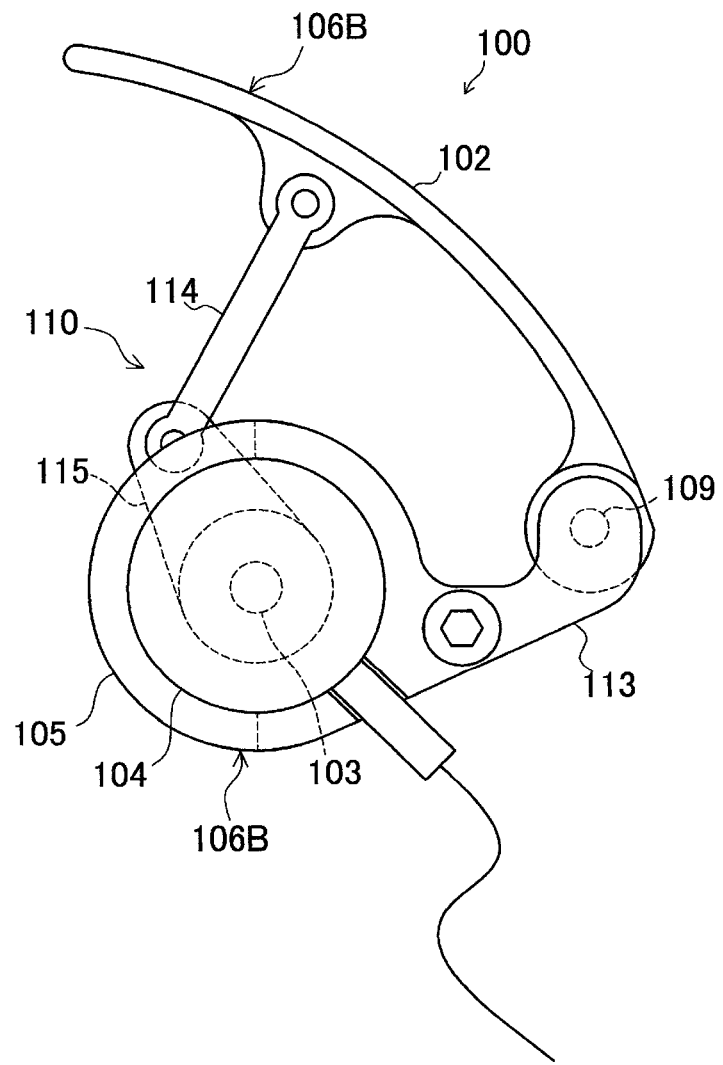
FIG. 13 is a left side view of the grip member in the haptic feedback unit.

As shown in FIGS. 9 and 13, the movable portion 102 is pivotable within a predetermined range. In the present embodiment, the movable portion 102 includes no return spring or similar component. To use the grip member 100, for example, a fastener 112 including a hook-and-loop fastener may be used to fasten a fingertip of the user to the movable portion 102 as shown in FIG. 6 or 7. The user can thus pull the movable portion 102 back to the original position after pushing the movable portion 102 toward the casing 105 with his or her fingertip.

Figure 8:
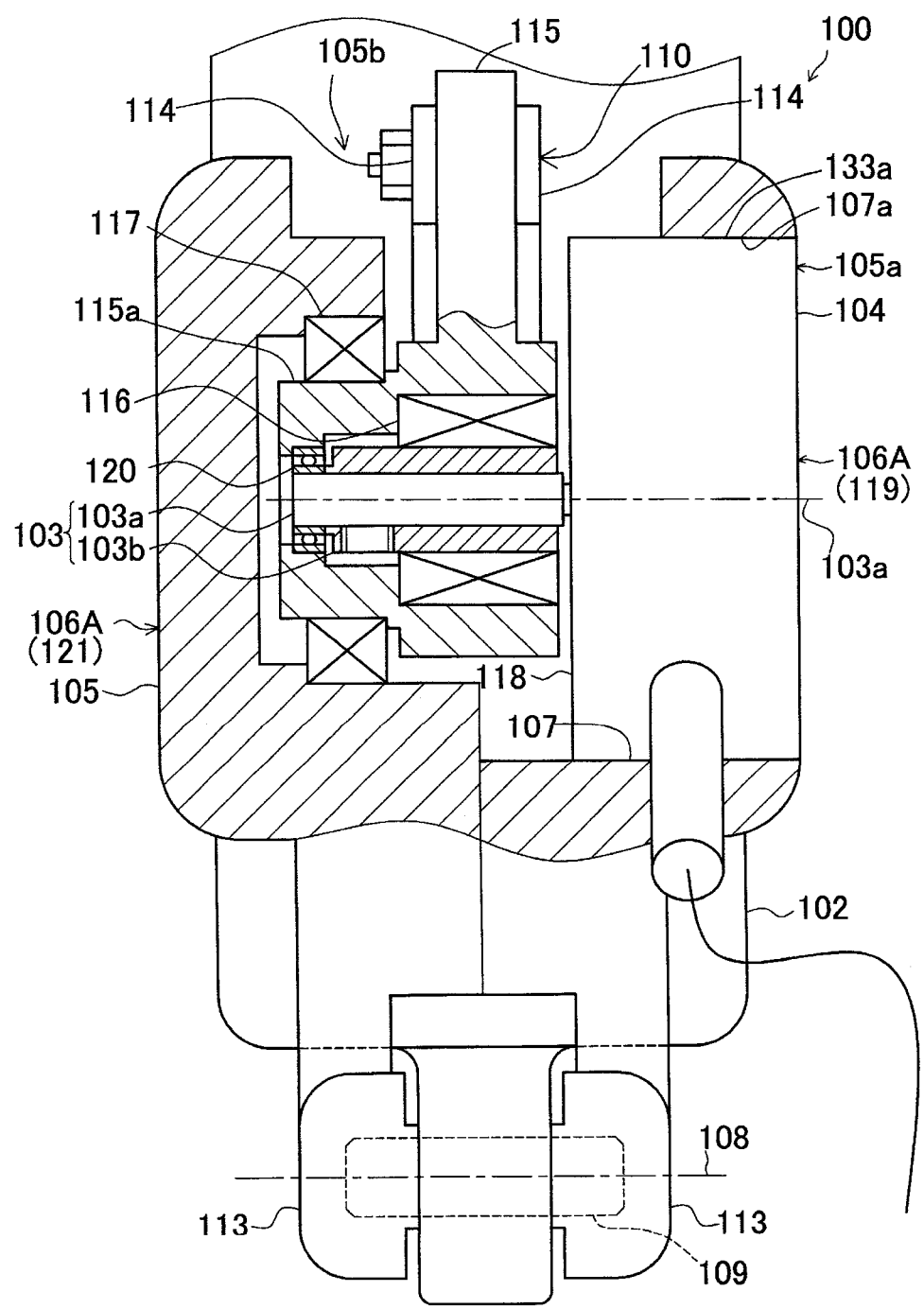
FIG. 8 is a bottom view of the grip member in the haptic feedback unit, showing components including a casing and a boss of a second link member in a cross section.

The link mechanism 110 links the movable portion 102 with the rotational shaft 103 in a cooperative manner. As shown in FIG. 9, the link mechanism 110 includes first link members 114 and a second link member 115. The first link members 114 each have one end pivotably connected to the underside of the movable portion 102, and the other end pivotably connected to a distal portion of the second link member 115. As shown in FIG. 7, two first link members 114 are used in the present embodiment and are pivotably connected at both sides of the second link member 115. As shown in FIG. 8, the second link member 115 has its base coupled to the rotational shaft 103 with a one-way clutch 116. The base of the second link member 115 has a boss 115a supported in the casing 105 with a bearing 117. Inside the boss 115a, a distal end of the rotational shaft 103 is supported with a bearing 120. The rotational shaft 103 includes a solid shaft 103a protruding from the rotational resistance generator 104, and a hollow shaft 103b fitted on the outer surface of the solid shaft 103a in a manner rotatable together with the solid shaft 103a. However, the rotational shaft 103 may be formed as a single component. The solid shaft 103a alone may be hereafter simply referred to as the rotational shaft 103.

When the user pushes the movable portion 102 toward the casing 105, the one-way clutch 116 transmits the operation force transmitted from the movable portion 102 to the rotational shaft 103 and the rotational resistance generator 104 through the link mechanism 110. Thus, when the user pulls back the movable portion 102 from the casing 105, the one-way clutch 116 does not transmit the operation force transmitted from the movable portion 102 to the rotational shaft 103 and the rotational resistance generator 104 through the link mechanism 110.

The rotational resistance generator 104 applies rotational resistance to the rotational shaft 103 to apply pivot resistance (movement resistance) to the movable portion 102. The rotational resistance generator 104 according to the present embodiment applies a magnetic field with the strength corresponding to the current externally fed to a magnetic viscous fluid to apply the rotational resistance corresponding to the current to the rotational shaft 103. The rotational resistance generator 104 has a substantially cylindrical profile, and allows the rotational shaft 103 to protrude from a first end face 118 of the rotational resistance generator 104. A specific example of the internal structure of the rotational resistance generator 104 will be described in detail later. As shown in FIG. 8, the rotational shaft 103 has an axis 103a substantially parallel to the pivot axis 108 of the movable portion.

The casing 105 includes a holder 107. The holder 107 accommodates, for example, the rotational shaft 103, the rotational resistance generator 104, the boss 115a of the second link member 115, and the bearing 117. A portion 107a of the holder 107 for accommodating the rotational resistance generator 104 is shaped to receive an outer peripheral portion 133a of the rotational resistance generator 104 in a fitted manner. The casing 105 has, at one side, a window 105a through which a second end face 119 of the rotational resistance generator 104 is exposed. The second end face 119 of the rotational resistance generator 104 is flat.

Figure 10:
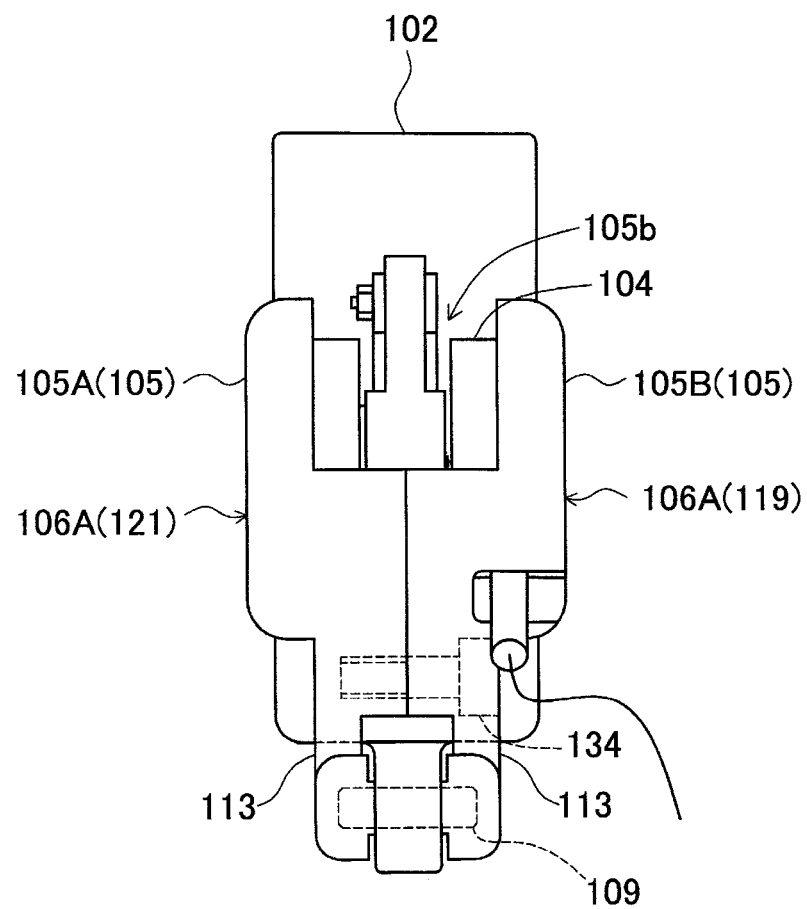
FIG. 10 is a bottom view of the grip member in the haptic feedback unit.
Figure 11:
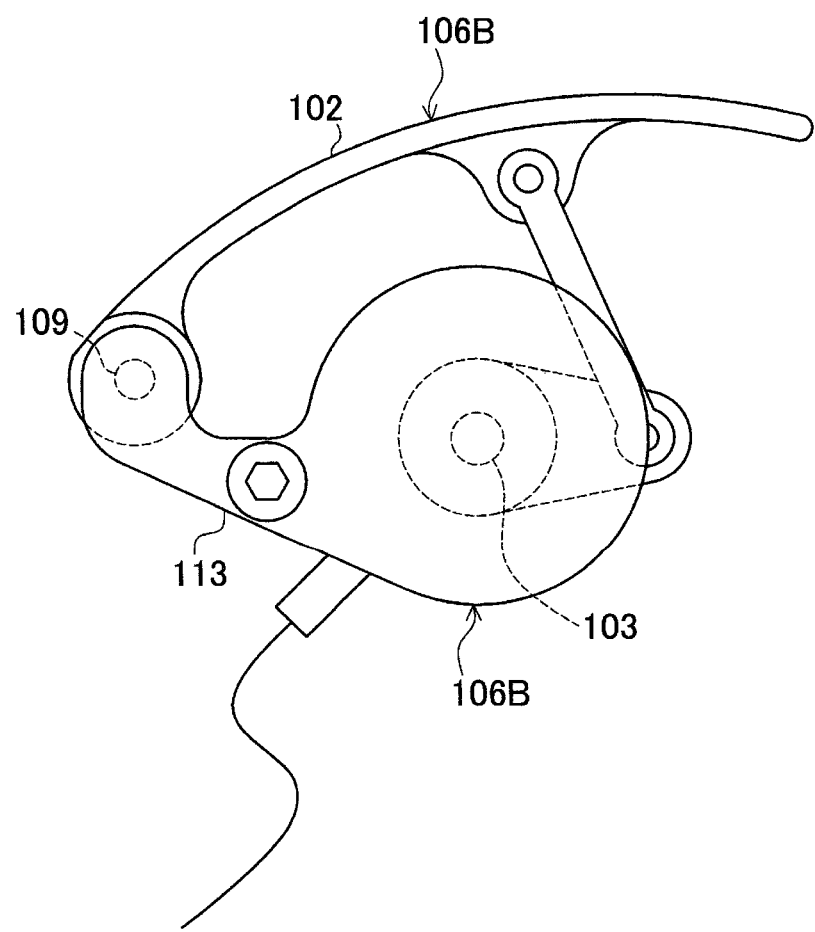
FIG. 11 is a right side view of the grip member in the haptic feedback unit.

As shown in FIG. 9, the casing 105 has a substantially cylindrical profile. As shown in FIGS. 9 and 10, a pair of support arms 113 extend outward from a portion of the casing 105. The pivot shaft 109 described above extends across distal ends of the pair of support arms 113. The casing 105 has an opening 105b (refer to FIGS. 7 and 10) to prevent interference with the link mechanism 110. As shown in FIG. 10, the casing 105 according to the present embodiment includes two casing members 105A and 105B fastened with a bolt 134.

The holding portions 106A and 106B of the grip member 100 are gripped by a user operating the movable portion 102 with his or her digits. The grip member 100 according to the present embodiment includes at least two holding portions 106A and 106B.

Figure 12:
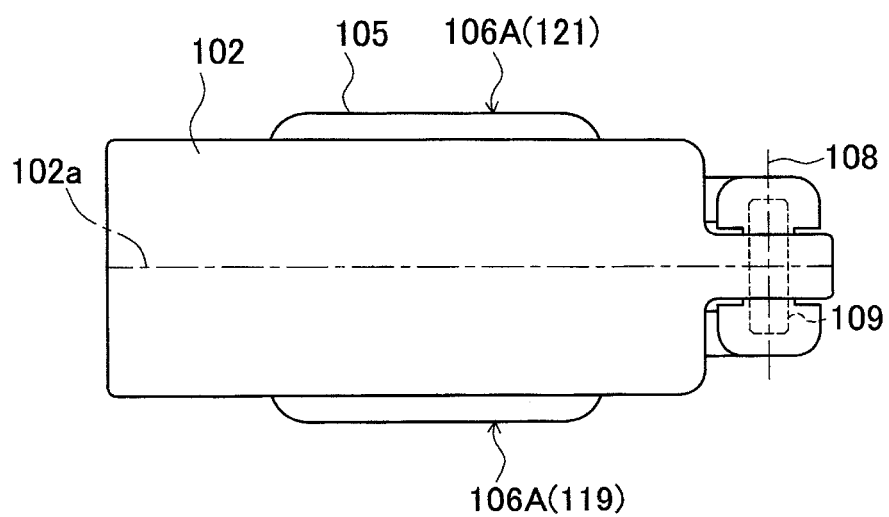
FIG. 12 is a plan view of the grip member in the haptic feedback unit.

The holding portions 106A are located on both sides of the casing 105. In the present embodiment, as shown in FIG. 12, the casing 105 has its two sides across a centerline 102a of the movable portion 102 that pivots. In other words, the casing 105 has its two sides across a plane including a locus to be drawn by the centerline 102a of the movable portion 102 when the movable portion 102 is moved. The casing 105 has flat surfaces on both sides, one including its side surface 121 alone, and the other including the second end face 119 of the rotational resistance generator 104. The side surface 121 of the casing 105 and the second end face 119 of the rotational resistance generator 104 are substantially parallel to the centerline 102a of the movable portion 102 that pivots.

As shown in FIG. 7, the user grips the holding portions 106A with a thumb 123 and a middle finger 124, with his or her forefinger 125 placed along the movable portion 102. While holding the grip member 100 in this manner, the user operates the movable portion 102 with the forefinger 125.

As shown in FIG. 6, the other holding portions 106B include the movable portion 102 and a side portion 126 of the casing 105 opposite to the movable portion 102. The user can grip the grip member 100 while placing the thumb 123 along the side portion 126 of the casing 105 opposite to the movable portion 102, and placing the forefinger 125 along the movable portion 102. While holding the grip member 100 in this manner as well, the user can operate the movable portion 102 with the forefinger 125.

An example structure of the rotational resistance generator 104 will be described with reference to FIG. 14. The rotational resistance generator 104 illustrated in FIG. 14 includes a disk 128, yokes 129 and 130, a coil 131, a magnetic viscous fluid 132, and a case 133.

The disk 128 is an internal rotor that rotates in the rotational resistance generator 104. The disk 128 is formed from a magnetic material. The rotational shaft 103 is perpendicularly connected to a center portion of a back surface 128b of the disk 128. Thus, the disk 128 and the rotational shaft 103 rotate integrally. The rotational shaft 103 is supported in a shaft hole 136 in the yoke 130 with bearings 135. The rotational shaft 103 may be formed from a non-magnetic material.

The yoke includes a first yoke 129 and a second yoke 130. The first yoke 129 faces a surface 128a of the disk 128 with a clearance between them. The first yoke 129 is formed from a disk-shaped member. The first yoke 129 is fitted into and fixed to the hollow cylindrical case 133.

The second yoke 130 has an opposing surface 130a facing the back surface 128b of the disk 128 with a clearance between them. The second yoke 130 is fitted into and fixed to the hollow cylindrical case 133. The case 133, which defines the outer periphery of the rotational resistance generator 104, is fixed to the casing 105 (refer to FIG. 8) in a non-rotatable manner. In the present embodiment, as shown in FIG. 9, the case 133 is fixed to the casing 105 with a socket setscrew 127.

A sphere 137 formed from a non-magnetic material is accommodated in a space defined by a recess on the center portion of the first yoke 129 and a recess at the center of the end face of the rotational shaft 103.

The coil 131 is placed along an annular groove in the second yoke 130. The coil 131 receives a current from a power feed controller 202 (described later).

The magnetic viscous fluid 132 fills the clearance between the disk 128 and the first yoke 129 and the clearance between the disk 128 and the second yoke 130. The magnetic viscous fluid 132 is a liquid disperse medium in which magnetic particles are dispersed. Examples of the magnetic particles include metal nanoparticles. The magnetic particles are formed from a magnetizable metal material, and specifically a soft magnetic material, but are not limited to these. Examples of the soft magnetic material include iron, cobalt, nickel, and an alloy such as permalloy. Although not limited to a particular material, examples of the disperse medium include a hydrophobic silicone oil. The content of the magnetic particles in the magnetic viscous fluid may be, for example, 3 to 40 vol %. Various additives may be added to the magnetic viscous fluid to provide intended characteristics.

Figure 14:
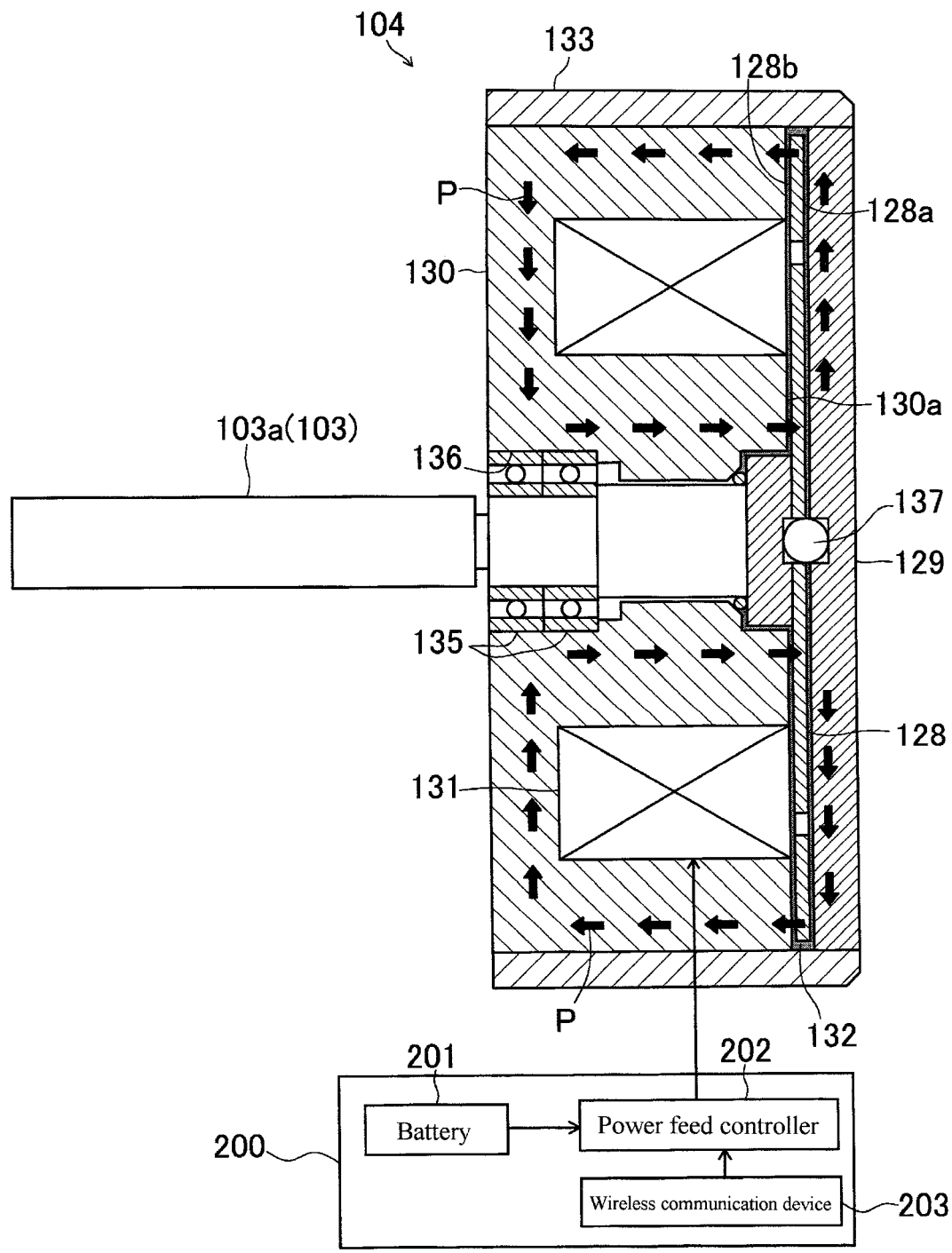
FIG. 14 is a cross-sectional view of a rotational resistance generator, also showing the power feeding unit in a block diagram.

In the rotational resistance generator 104 with the above structure, when a current is fed to the coil 131, a magnetic path forms in the disk 128, the first yoke 129, and the second yoke 130 in the direction of, for example, arrows P shown in FIG. 14. The magnetic path extends through the magnetic viscous fluid 132 filling the clearance between the surface 128a of the disk 128 and the first yoke 129 and the magnetic viscous fluid 132 filling the clearance between the back surface 128b of the disk 128 and the second yoke 130. The viscosity (shearing stress) corresponding to the strength of the magnetic field thus appears in the magnetic viscous fluid 132, and the torque transmitted between the disk 128 and the yokes 129 and 130 increases in accordance with the strength of the magnetic field. More specifically, the rotational resistance generator 104 applies rotational resistance corresponding to the current fed to the coil 131 to the rotational shaft 103.

The power feed unit 200 will now be described. The power feed unit 200 may be, for example, a portable power feed unit wearable on a portion of the user's body (on the waist in the example shown in FIG. 1). As shown in FIG. 6, the power feed unit 200 includes a battery 201, the power feed controller 202, and the wireless communication device 203. The power feed controller 202 controls the current fed from the battery 201 to the coil 131 in the rotational resistance generator 104 based on haptic information (parameter information indicating the current) about the virtual object received from the HMD control unit 3 through the wireless communication device 203. The power feed controller 202 controls the current fed to the coil 131 to function as a movement resistance controller that controls movement resistance to be applied to the movable portion 102.

The power feed controller 202 changes a current to be fed to the coil 131 between 0 A and a current value specified by the parameter information in accordance with the frequency and the duty ratio specified by the parameter information based on the haptic information (parameter information indicating the current) received from the HMD control unit 3.

As shown in FIG. 6 or 7, to use the haptic feedback unit 4 with the above structure, the user pushes or pulls back the movable portion 102 with his or her forefinger 125 while gripping the grip member 100 with his or her digits. When the user pushes the movable portion 102, the operation force applied on the movable portion 102 is transmitted to the rotational resistance generator 104 through the one-way clutch 116. Thus, resistance corresponding to the current fed to the coil 131 occurs against the action of pushing the movable portion 102, and is provided to the user as haptic feedback. In contrast, when the user pulls back the movable portion 102, the operation force applied on the movable portion 102 is not transmitted to the rotational resistance generator 104 through the one-way clutch 116. Thus, negligible resistance occurs against the action of pulling back the movable portion 102. The user can thus pull back the movable portion 102 with a small force.

Figure 15:
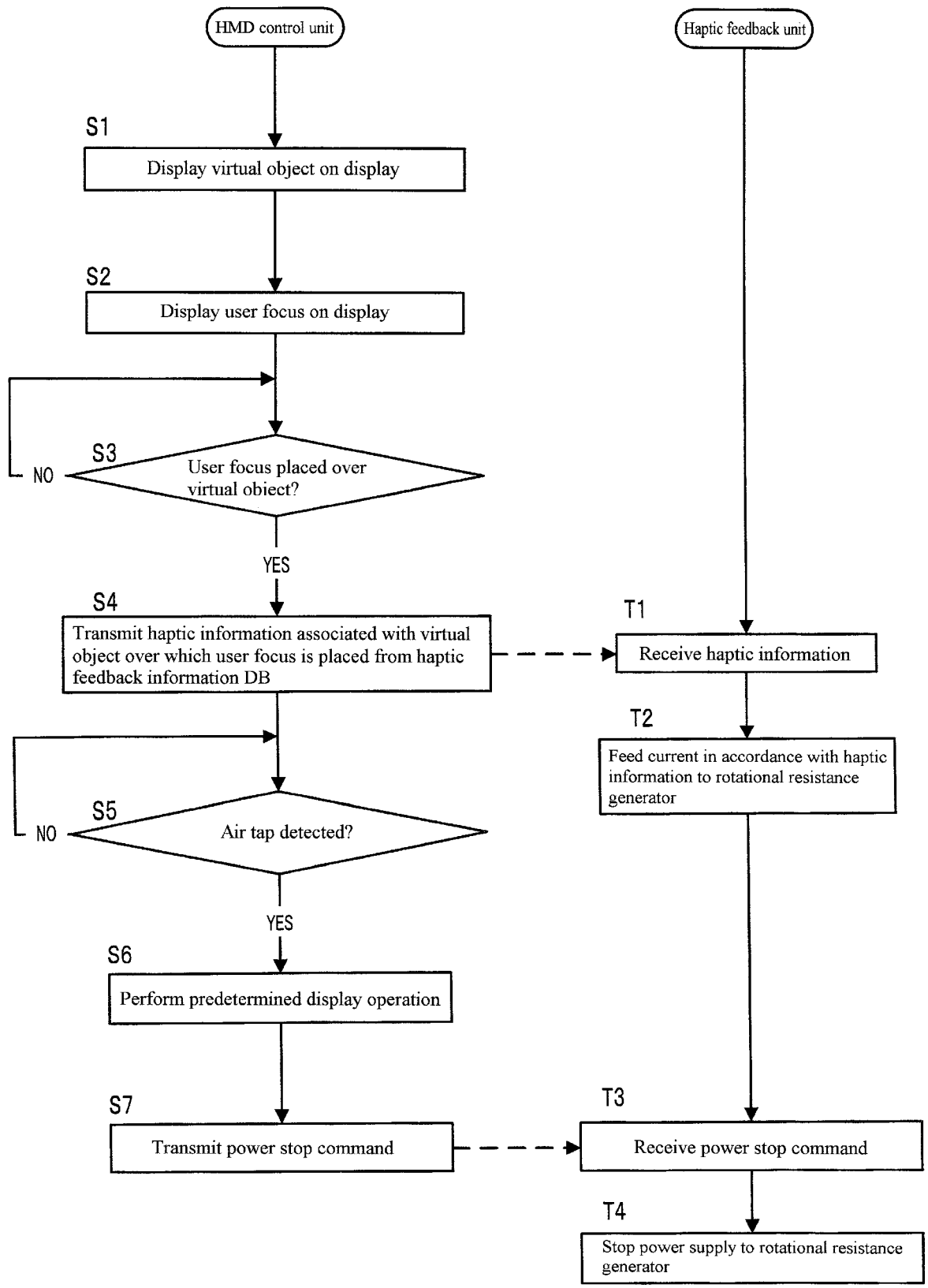
FIG. 15 is a flowchart of a process performed by the haptic feedback device for virtual objects.

A process performed by the haptic feedback device 1 for virtual objects will be described based on a flowchart shown in FIG. 15.

When the display controller 32 causes a virtual object to appear on the display 8 in a manner merged in the real world (S1) and also the user focus 28 to appear on the display 8 (S2), the superposition determination unit 33 repeatedly determines whether the user focus 28 is placed over the selectable virtual object 38 (S3).

When the superposition determination unit 33 determines that the user focus 28 is placed over the selectable virtual object 38 (Yes in S3), the haptic information transmitter 35 reads current parameter information as the haptic information associated with the virtual object 38 from the haptic information DB 22, and transmits the current parameter information to the haptic feedback unit 4 through the wireless communication device 24 (S4).

When the power feed controller 202 receives the current parameter information transmitted from the haptic information transmitter 35 through the wireless communication device 203 in the haptic feedback unit 4 (T1), the power feed controller 202 (movement resistance controller) controls the current to be fed from the battery 201 to the coil 131 in the rotational resistance generator 104 in accordance with the current parameter information (T2). Thus, the rotational resistance generator 104 applies a magnetic field with the strength corresponding to the current fed from the power feed controller 202 to the magnetic viscous fluid. Thus, the rotational resistance generator 104 applies the rotational resistance corresponding to the current on the rotational shaft 103, and the rotational resistance appears in the movable portion 102 through the link mechanism 110 as movement resistance. The movement resistance is provided to the user as haptic feedback to the user pushing the movable portion 102. The haptic feedback provided to the user pushing the movable portion 102 varies depending on, for example, the current value, the frequency, and the duty ratio of the current fed to the coil 131 in the rotational resistance generator 104.

Following the processing in step S4, the hand gesture recognizer 34 in the HMD control unit 3 repeatedly determines whether the user has performed a predetermined hand gesture (air tap). When the hand gesture recognizer 34 determines that the user has performed a predetermined hand gesture (Yes in S5), the display controller 32 performs a predetermined display operation on the display 8 (S6). Examples of the predetermined display operation include deforming a selected virtual object, causing a selected virtual object to disappear, or displaying another virtual object. Thereafter, the haptic information transmitter 35 transmits, to the haptic feedback unit 4, a command to stop providing haptic feedback (S7).

When the power feed controller 202 receives the command to stop providing haptic feedback transmitted from the haptic information transmitter 35 through the wireless communication device 203 in the haptic feedback unit 4 (T3), the power feed controller 202 (movement resistance controller) stops power supply to the coil 131 in the rotational resistance generator 104 (T4). Thus, the movable portion 102 stops providing haptic feedback.

When the user places the user focus 28 over a virtual object 38 and pushes the movable portion 102 in the haptic feedback unit 4, the above haptic feedback device 1 for virtual objects can provide haptic feedback corresponding to the virtual object to the user's hand. The operation of pushing the movable portion 102 in the haptic feedback unit 4 is the same action as the predetermined hand gesture (air tap). Thus, the user can receive haptic feedback while selecting the virtual object.

Second Embodiment

A second embodiment of the present invention will now be described. The second embodiment will be described focusing on its differences from the first embodiment. The components and functions of the second embodiment that are the same as in the first embodiment will not be described.

Figure 16:
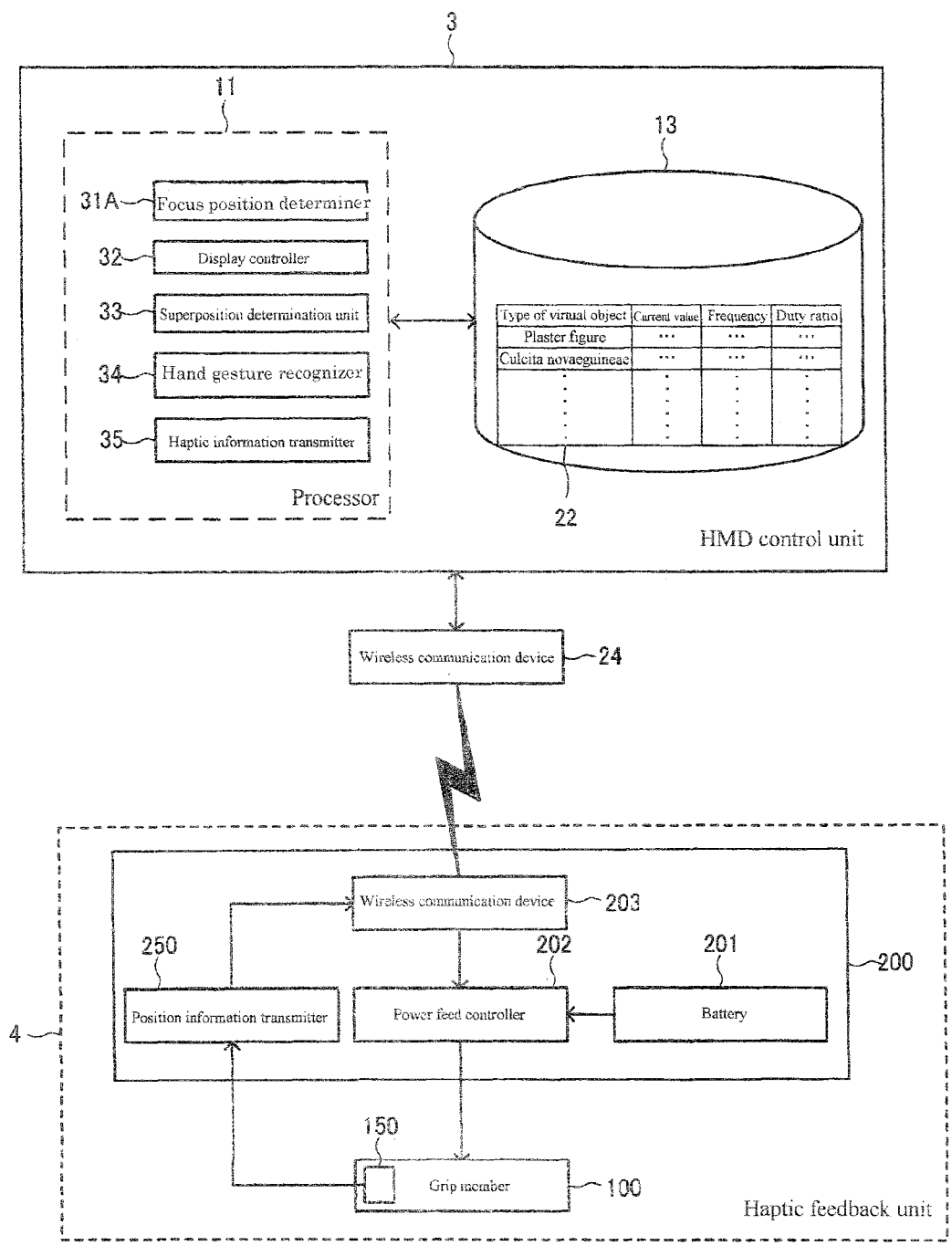
FIG. 16 is a functional block diagram of an HMD control unit and a haptic feedback unit according to a second embodiment.

As shown in FIG. 16, in a haptic feedback device for virtual objects according to the second embodiment, the grip member 100 includes a grip member position information detector 150 that detects information about the position of the grip member 100. Examples of the grip member position information detector 150 include the same inertial measurement unit as used for the above inertial measurement unit 20. The power feed unit 200 further includes a position information transmitter 250 that transmits information detected by the grip member position information detector 150 to the HMD control unit 3 through the wireless communication device 203.

A focus position determiner 31A in the HMD control unit 3 determines the position of the user focus 28 on the display 8 based on the information about the position of the grip member 100 obtained from the grip member position information detector 150 in the grip member 100. More specifically, in the present embodiment, the user focus 28 can be shifted by moving the user's hand holding the grip member 100, instead of being shifted by changing the user's gaze.

Third Embodiment

A third embodiment of the present invention will now be described. The third embodiment will be described focusing on its differences from the first embodiment. The components and functions of the third embodiment that are the same as in the first embodiment will not be described.

Figure 17:
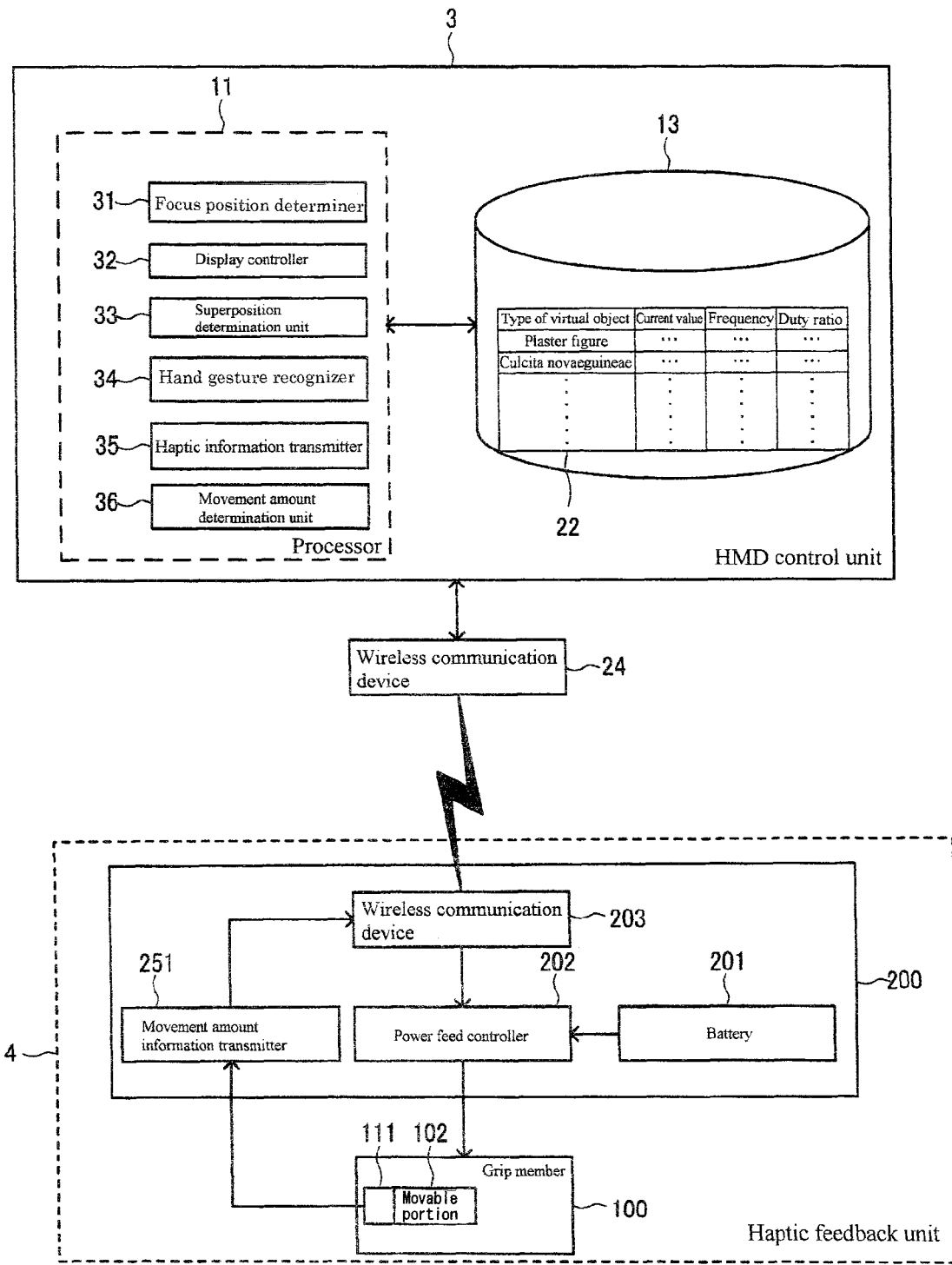
FIG. 17 is a functional block diagram of an HMD control unit and a haptic feedback unit according to a third embodiment.

As shown in FIG. 17, in a haptic feedback device for virtual objects according to the third embodiment, the grip member 100 in the haptic feedback unit 4 includes a movement amount detector 111 that detects information about the amount of movement from a predetermined position of the movable portion 102 (the position to which the movable portion 102 is pulled back to its maximum in the present embodiment). The power feed unit 200 also includes a movement amount information transmitter 251 that transmits information about the movement amount detected by the movement amount detector 111 to the HMD control unit 3 through the wireless communication device 203.

The processor 11 in the HMD control unit 3 also functions as a movement amount determination unit 36 that determines whether a movement amount is larger than or equal to a predetermined amount based on the information about the movement amount of the movable portion 102 in the haptic feedback unit 4 obtained from the movement amount detector 111. When the movement amount determination unit 36 determines that the movement amount of the movable portion 102 is larger than or equal to the predetermined amount while the user focus 28 is placed over the selectable virtual object 38, the display controller 32 performs a predetermined display operation on the display 8. Examples of the predetermined display operation include deforming the selected virtual object, causing the selected virtual object to disappear, and displaying another virtual object.

Figure 18:
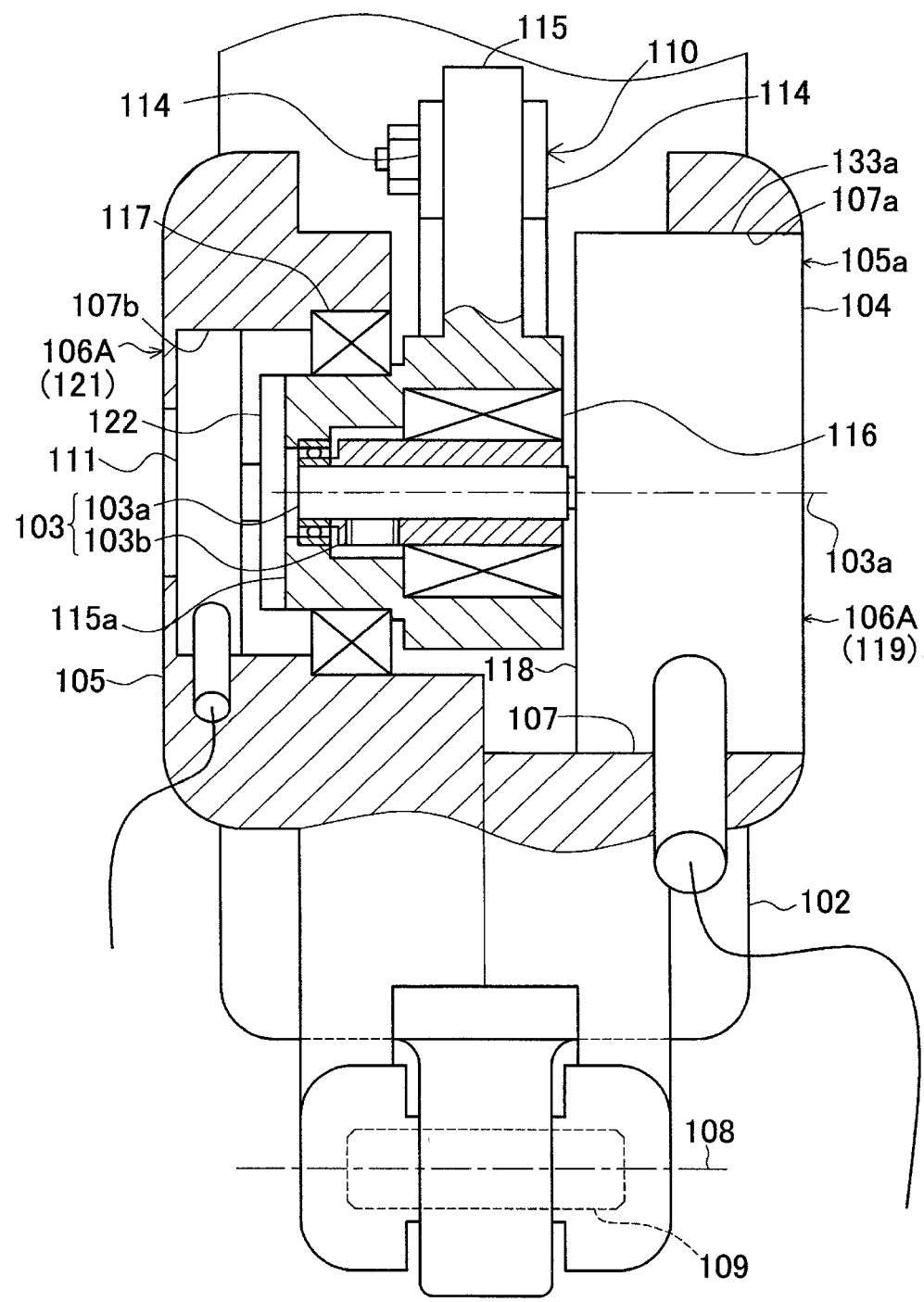
FIG. 18 is a bottom view of a grip member in a haptic feedback unit according to the third embodiment or a fourth embodiment, showing components including a casing and a boss of a second link member in a cross section.

FIG. 18 shows a specific example of the above movement amount detector 111. Examples of the movement amount detector 111 include an encoder and a variable resistor. The movement amount detector 111 shown in the figure is fitted into a predetermined portion 107b of the holder 107 in the casing 105, and has an input connected to the boss 115a of the second link member 115 with a coupling member 122. The boss 115a of the second link member 115 rotates in a cooperative manner with the movable portion 102 being moved. Thus, the movement amount detector 111 detects the movement amount of the movable portion 102 by detecting the amount of rotation of the boss 115a.

Fourth Embodiment

A fourth embodiment of the present invention will now be described. The fourth embodiment will be described focusing on its differences from the first embodiment. The components and functions of the fourth embodiment that are the same as in the first embodiment will not be described.

Figure 19:
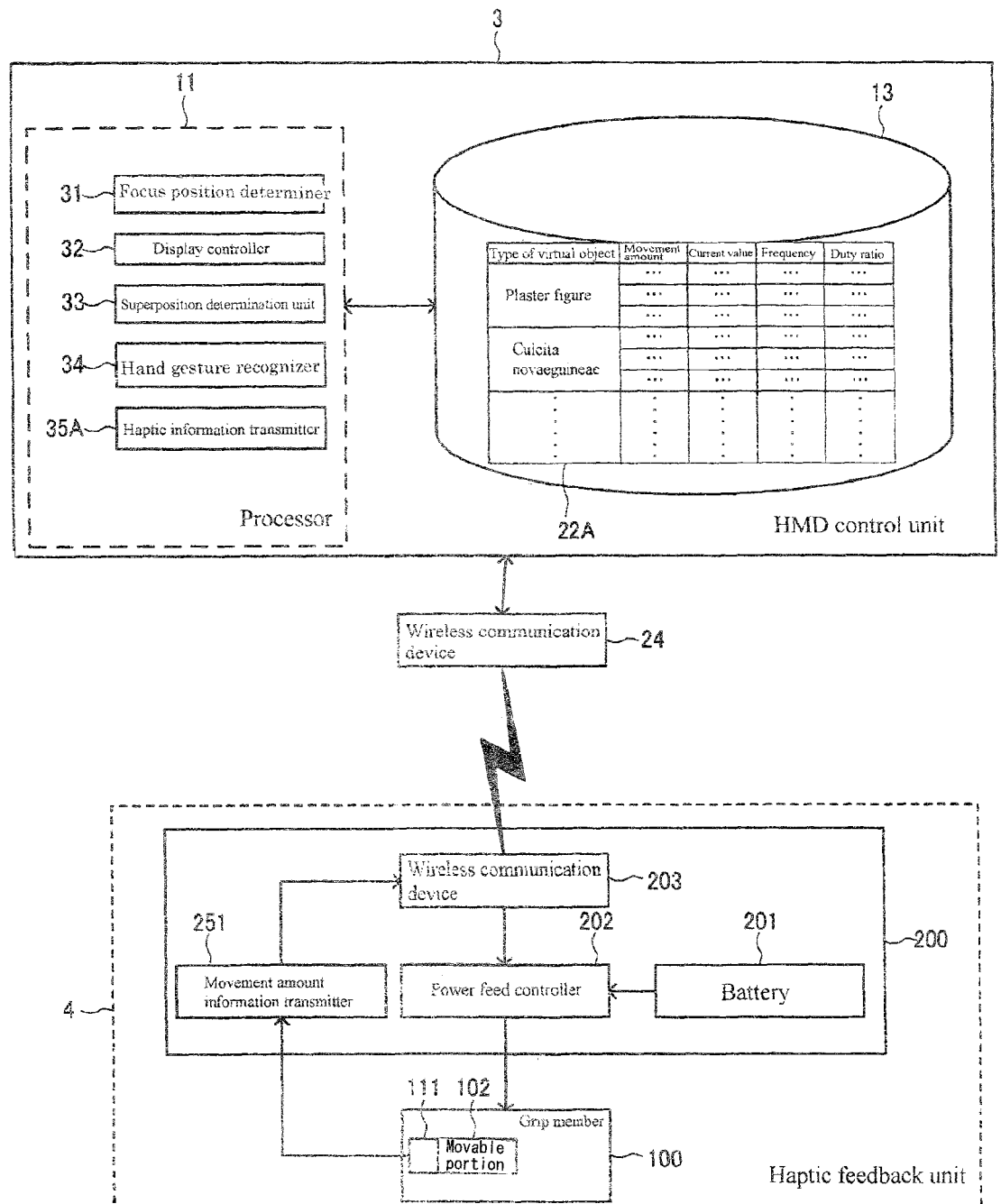
FIG. 19 is a functional block diagram of an HMD control unit and a haptic feedback unit according to the fourth embodiment.

As shown in FIG. 19, in a haptic feedback device for virtual objects according to the fourth embodiment, the grip member 100 in the haptic feedback unit 4 includes a movement amount detector 111 that detects information about the movement amount of the movable portion 102 from a predetermined position (the position to which the movable portion 102 is pulled back to its maximum in the present embodiment). The power feed unit 200 includes a movement amount information transmitter 251 that transmits information about the movement amount detected by the movement amount detector 111 to the HMD control unit 3 through the wireless communication device 203 (as described in the third embodiment).

In the present embodiment, as shown in FIG. 19, a haptic information DB 22A stores current parameter information about the current to be fed to the rotational resistance generator 104 included in the haptic feedback unit 4 in association with the type of a selectable virtual object and the movement amount of the movable portion 102. The parameter information includes the current value, the frequency, and the duty ratio for each type of virtual object and each movement amount. In the present embodiment, three values are stored for each of the movement amount, the current value, the frequency, and the duty ratio for each type of virtual object.

When the user focus 28 is placed over the selectable virtual object 38, a haptic information transmitter 35A in the HMD control unit 3 reads, from the haptic information DB 22A, the haptic information (current parameter information) associated with the type of the selected virtual object 38 and the information about the movement amount of the movable portion 102 transmitted from the haptic feedback unit 4, and transmits the haptic information to the haptic feedback unit 4.

In the present embodiment, three values for each item of current parameter information are set for each type of virtual object. Thus, three levels of haptic feedback are sequentially provided in accordance with the amount by which the user pushes the movable portion 102.

Other Modifications

In the above embodiments, a see-through display is used to display a composite image of the real world and virtual objects in the field of view of a user. Instead, a nontransparent display may be used to display virtual objects alone without allowing an image of the real world to be viewed through.

Instead of the head-mounted display unit 2 according to the above embodiments, an ordinary on-site display unit may be used. A display included in the on-site display unit may be a see-through display that can display a composite image of the real world and virtual objects in the field of view of a user, or a nontransparent display that displays virtual objects alone without allowing an image of the real world to be viewed through.

When an ordinary on-site display is used, information about the direction of the user's gaze (direction in which the user faces) as information used to allow the user focus 28 (virtual object selector) to appear on the display can be obtained from the inertial measurement unit 20 worn on the head of the user 6 with any method. The information about the direction of the user's gaze can be obtained by any known method instead of the above method.

REFERENCE SIGNS LIST 1 haptic feedback device
2 head-mounted display unit (display unit)
3 HMD control unit (display control unit)
4 haptic feedback unit
8, 8L, 8R display
10 program
11 processor
13 storage
17 environment recognition camera
18 depth camera
19 infrared camera
20 inertial measurement unit
22 haptic information database
28 user focus
31 focus position determiner
32 display controller
33 superposition determination unit
34 hand gesture recognizer
35 haptic information transmitter
36 movement amount determination unit
38 virtual object
100 grip member
102 movable portion
103 rotational shaft (rotary portion)
104 rotational resistance generator
111 movement amount detector
128 disk (internal rotor)
132 magnetic viscous fluid
150 grip member position information detector
200 power feed unit
250 position information transmitter
251 movement amount information transmitter

The invention claimed is:

1. A haptic feedback device for virtual objects, comprising:
a display unit;
a display control unit, comprising a processor, configured to control a display included in the display unit;
a haptic feedback unit configured to provide haptic feedback to a user; and
a haptic information storage configured to store haptic information in association with a type of a selectable virtual object,
the display control unit including
a display controller configured to cause a selectable virtual object and a virtual object selector to appear on the display, the virtual object selector allowing the selectable virtual object to be selected with an operation performed by the user, and
a haptic information transmitter configured to read, when the selectable virtual object is selected by the virtual object selector, haptic information associated with a type of the virtual object selected, from the haptic information storage, and transmit the haptic information to the haptic feedback unit, and
the haptic feedback unit including
a movable portion movable with an operation performed by the user,
a movement resistance generator configured to apply movement resistance to the movable portion, and
a movement resistance controller configured to control the movement resistance to be applied by the movement resistance generator to the movable portion in accordance with the haptic information received from the haptic information transmitter,
wherein the movement resistance generator in the haptic feedback unit includes
a rotary portion configured to rotate in combination with the movable portion, and a rotational resistance generator configured to apply rotational resistance to the rotary portion, and the rotational resistance generator includes an internal rotor configured to rotate together with the rotary portion, a magnetic viscous fluid filling a clearance around the internal rotor, and an electromagnet configured to apply a magnetic field onto the magnetic viscous fluid.

2. The haptic feedback device for virtual objects according to claim 1, wherein the display unit is a head-mounted display unit, the virtual object selector is a user focus shiftable with an operation performed by the user, and the haptic information transmitter reads, when the user focus overlaps the selectable virtual object, haptic information associated with the type of the virtual object selected from the haptic information storage, and transmits the haptic information to the haptic feedback unit.

3. The haptic feedback device for virtual objects according to claim 2, wherein the movement resistance generator and the movable portion included in the haptic feedback unit are part of a grip member to be held and movable by a hand of the user, the grip member includes a grip member position information detector configured to detect information about a position of the grip member, and the display control unit includes a focus position determiner configured to determine a position of the user focus appearing on the display based on the information about the position detected by the grip member position information detector.

4. The haptic feedback device for virtual objects according to claim 1, further comprising:

a hand state detector configured to detect information about a user's hand state, wherein the display control unit includes a hand gesture recognizer configured to determine whether the user has performed a predetermined hand gesture based on the information detected by the hand state detector, and the display control unit performs a predetermined process when the hand gesture recognizer determines that the user has performed the predetermined hand gesture in a state where the selectable virtual object is being selected by the virtual object selector.

5. The haptic feedback device for virtual objects according to claim 1, wherein the haptic feedback unit further includes a movement amount detector configured to detect information about a movement amount of the movable portion, and the display control unit performs a predetermined process when the movement amount detected by the movement amount detector is larger than or equal to a predetermined value in a state where the selectable virtual object is being selected by the virtual object selector.

6. The haptic feedback device for virtual objects according to claim 4, wherein the predetermined process is a predetermined display operation on the display performed by the display controller included in the display control unit.

7. The haptic feedback device for virtual objects according to claim 1, wherein the haptic feedback unit further includes a movement amount detector configured to detect information about a movement amount of the movable portion, the haptic information storage stores haptic information in association with the type of the selectable virtual object and the movement amount of the movable portion, and the haptic information transmitter in the display control unit reads, in a state where the selectable virtual object is being selected by the virtual object selector, haptic information associated with the type of the virtual object selected and the movement amount of the movable portion from the haptic information storage, and transmits the haptic information to the haptic feedback unit.

8. A non-transitory computer-readable storing medium storing a program causing a computer to function as a display control unit included in a haptic feedback device for virtual objects, the haptic feedback device comprising:

a display unit;

a display control unit, comprising a processor, configured to control a display included in the display unit;

a haptic feedback unit configured to provide haptic feedback to a user; and a haptic information storage configured to store haptic information in association with a type of a selectable virtual object, the haptic feedback unit including a movable portion movable with an operation performed by the user, a movement resistance generator configured to apply movement resistance to the movable portion, and a movement resistance controller configured to control the movement resistance applied by the movement resistance generator to the movable portion in accordance with haptic information received from a haptic information transmitter, and the program causing the display control unit to function as a display controller configured to cause a selectable virtual object and a virtual object selector to appear on the display, the virtual object selector allowing the selectable virtual object to be selected with an operation performed by the user, and the haptic information transmitter configured to read, when the selectable virtual object is selected by the virtual object selector, haptic information associated with a type of the virtual object selected, from the haptic information storage, and transmit the haptic information to the haptic feedback unit, wherein the movement resistance generator in the haptic feedback unit includes a rotary portion configured to rotate in combination with the movable portion, and a rotational resistance generator configured to apply rotational resistance to the rotary portion, and the rotational resistance generator includes an internal rotor configured to rotate together with the rotary portion, a magnetic viscous fluid filling a clearance around the internal rotor, and an electromagnet configured to apply a magnetic field onto the magnetic viscous fluid.

* * * * *